(12) United States Patent
Sagata (10) Patent No.: US 7,812,974 B2
(45) Date of Patent: Oct. 12, 2010

(54) IMAGE PROCESSING APPARATUS FOR ARRANGING CONTENT ONTO A REDUCED NUMBER OF OUTPUT PAGES

(75) Inventor: Osamu Sagata, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1031 days.

(21) Appl. No.: 11/220,146

(22) Filed: Sep. 6, 2005

(65) Prior Publication Data
US 2006/0050293 A1    Mar. 9, 2006

(30) Foreign Application Priority Data
Sep. 7, 2004    (JP)    ............... 2004-259104

(51) Int. Cl.
*G06K 15/02* (2006.01)
*G06F 3/12* (2006.01)
(52) U.S. Cl. .............. 358/1.11; 358/1.1; 358/1.13; 358/1.2; 715/261; 715/234
(58) Field of Classification Search .............. 358/1.13
See application file for complete search history.

(56) References Cited

U.S. PATENT DOCUMENTS

| 6,906,826 | B1 | 6/2005 | Kuwata et al. | |
| 7,103,849 | B2 * | 9/2006 | Aikawa | 715/777 |
| 7,386,790 | B2 * | 6/2008 | Hino | 715/269 |
| 2003/0160975 | A1 * | 8/2003 | Skurdal et al. | 358/1.2 |
| 2003/0160977 | A1 * | 8/2003 | Nishikawa et al. | 358/1.2 |

FOREIGN PATENT DOCUMENTS

| JP | 2000215306 A | | 8/2000 |
| JP | 2000263873 A | | 9/2000 |
| JP | 2001-270187 A | | 10/2001 |
| JP | 2003134323 A | * | 5/2003 |
| JP | 2003303088 A | | 10/2003 |

* cited by examiner

*Primary Examiner*—Mark K Zimmerman
*Assistant Examiner*—Huo Long Chen
(74) *Attorney, Agent, or Firm*—Panitch Schwarze Belisario & Nadel LLP (57) ABSTRACT

A storing unit stores document information received from an OS through an AP processing unit. A character size information extracting unit extracts representation character size information that represents a maximum size of characters whose accumulated number reaches a predetermined ratio of a total number of characters included in the document information. A resolution information extracting unit extracts resolution information. A page number deciding unit decides an arranged page number serving as the number of logical pages from the representation character size information and the resolution information. A page arranging unit converts the document information stored in the storing unit into the logical pages and arranges them to a physical page based on the logical pages and the arranged page number. The inputted document information divided into a plurality of logical pages is converted into image information consisting of physical pages of the number smaller than the number of logical pages.

8 Claims, 9 Drawing Sheets

| | |
|---|---|
| 25 | → THE TOTAL NUMBER OF CHARACTERS |
| 5 | → THE NUMBER OF CHARACTERS OF 40pt OR SMALLER |
| 10 | → THE NUMBER OF CHARACTERS OF 38pt OR SMALLER |
| ⋮ | ⋮ |
| 10 | → THE NUMBER OF CHARACTERS OF 6pt OR SMALLER |
| 0 | → THE NUMBER OF CHARACTERS OF 4pt OR SMALLER |

FIG.2B

| 600 |
|---|

↑ RESOLUTION

FIG.2C

| 300DPI | 600DPI |
|---|---|
| 6pt → 1 | 4pt → 1 |
| 8pt → 2 | 6pt → 2 |
| 12pt → 4 | 10pt → 4 |
| ⋮ | ⋮ |
| 40pt → 20 | 38pt → 20 |

|  | 300DPI | 600DPI | 1200DPI |
|---|---|---|---|
| 1-UP | 6 | 4 | 4 |
| 2-UP | 8 | 6 | 5 |
| 4-UP | 12 | 10 | 8 |
| 6-UP | 14 | 12 | 10 |
| 9-UP | 16 | 14 | 12 |
| 16-UP | 24 | 20 | 18 |

300DPI    600DPI

IMAGE PROCESSING APPARATUS FOR ARRANGING CONTENT ONTO A REDUCED NUMBER OF OUTPUT PAGES

BACKGROUND OF THE INVENTION

1. Field of the Invention

The invention relates to an image processing apparatus and, more particularly, to an image processing apparatus in which contents of a plurality of inputted pages are reduced and arranged to pages of the number smaller than the number of inputted pages.

2. Related Background Art

Hitherto, in print systems such as printer, facsimile, and the like, there is a print system for executing what is called allocation printing in which contents of a plurality of inputted pages are reduced and arranged to pages of the number smaller than the number of inputted pages in order to obtain an effect of saving resources. According to such a print system, for example, by printing the contents of four pages into one page, a document of 20 pages can be printed by five sheets of paper. In the ordinary allocation printing, when printing, the user sets the number of pages to be arranged to one page (hereinafter, referred to as an arranged page number) into an image processing apparatus and a printing apparatus receives print data according to the setting from the image processing apparatus and prints it. In this case, the user needs to set the allocation printing in a range where visibility of the pages which were reduced and arranged does not deteriorate in consideration of the contents of the document to be printed.

Such a setting not only burdens the user but also causes a possibility that the sheets are wastefully consumed due to an erroneous setting. To prevent such a drawback, an image processing apparatus in which a size of character in a document is confirmed and the arranged page number is determined in the range where the visibility of the pages does not deteriorate has also been proposed (for example, refer to JP-A-2001-270187). According to such a technique, the arranged page number is determined only by the character size. However, even in the same character size, for example, if a print condition such as resolution or the like differs, there is also a possibility that the visibility of the pages deteriorates. Such an example will be described with reference to the drawings.

Figure 9A:
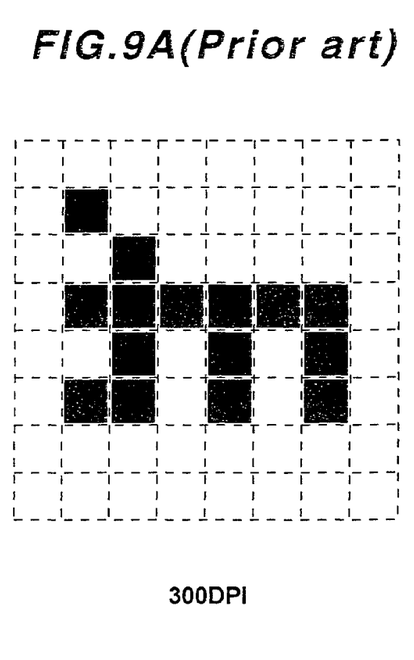
FIGS. 9A and 9B are explanatory diagrams of an example in which visibility deteriorates in the same character size.
Figure 9B:
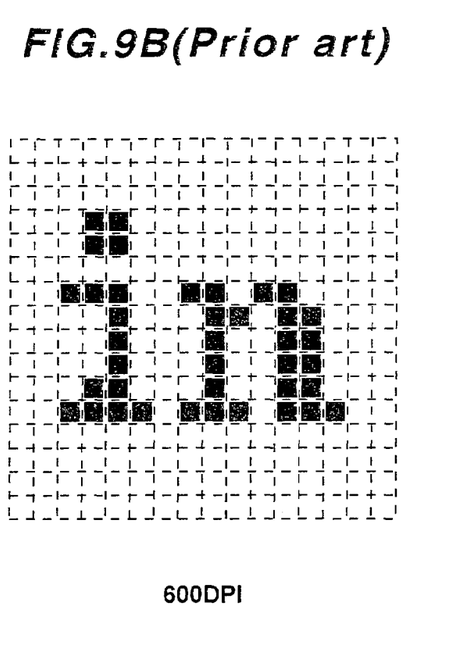

FIGS. 9A and 9B are explanatory diagrams of the example in which the visibility deteriorates in the same character size.

FIGS. 9A and 9B are diagrams in the case where the same character "in" is printed in the same character size at resolution of 300 dpi and 600 dpi, respectively. It will be easily understood that there is a large difference of the visibility between them.

It is, therefore, a problem to be solved that once the arranged page number is determined only by the character size, even in the same character size, for example, if the print condition such as resolution or the like differs, there is a possibility that the visibility of the pages deteriorates.

SUMMARY OF THE INVENTION

It is, therefore, an object of the invention to provide an image processing apparatus in which contents of a plurality of inputted pages are reduced and arranged to pages of the number smaller than the number of inputted pages.

According to the present invention, there is provided an image processing apparatus, comprising:

a storage unit which stores a document information;

a first information extractor which extracts first feature information from the document information;

a second information extractor which extracts second feature information different from the first feature information from the document information;

a page number deciding unit which decides an arranged page number serving as the number of logical pages included in one physical page on the basis of the first feature information and the second feature information; and a page arranging unit which converts the document information stored in the storage unit into the logical pages and arranges the logical pages into the physical page on the basis of the arranged page number.

Moreover, the image processing apparatus may further comprise a parameter storing unit which stores parameter information for specifying decision of the arranged page number by the page number deciding unit.

Moreover, the image processing apparatus may further comprise a setting display unit which displays a setting dialog in order to set the parameter information; and a parameter setting input unit which obtains a setting input based on the dialog.

Moreover, the image processing apparatus may further comprise a display unit which displays a confirmation evaluation dialog to obtain a confirmation evaluation of a setting result of the parameter information; and a parameter correcting unit which corrects the parameter information on the basis of the confirmation evaluation of the setting result.

Moreover, in the image processing apparatus, the first feature information may be a character size.

Moreover, in the image processing apparatus, the second feature information may be resolution.

Moreover, in the image processing apparatus, the second feature information may be font information.

Since the arranged page number is determined by combining a plurality of feature information, there is such an effect that the deterioration in the visibility of the arranged pages decreases.

The above and other objects and features of the present invention will become apparent from the following detailed description and the appended claims with reference to the accompanying drawings.

DETAILED DESCRIPTION OF THE PREFERRED EMBODIMENTS

A first feature information extracting unit (i.e. a first information extractor), a second feature information extracting unit (i.e. a second information extractor), and a page number deciding unit for deciding the arranged page number are constructed by predetermined programs which are executed by a CPU (central processing unit) provided for an information processing apparatus. In the embodiment, the predetermined programs are included in a printer driver (program) which is installed in the information processing apparatus.

Embodiment 1

Figure 1:
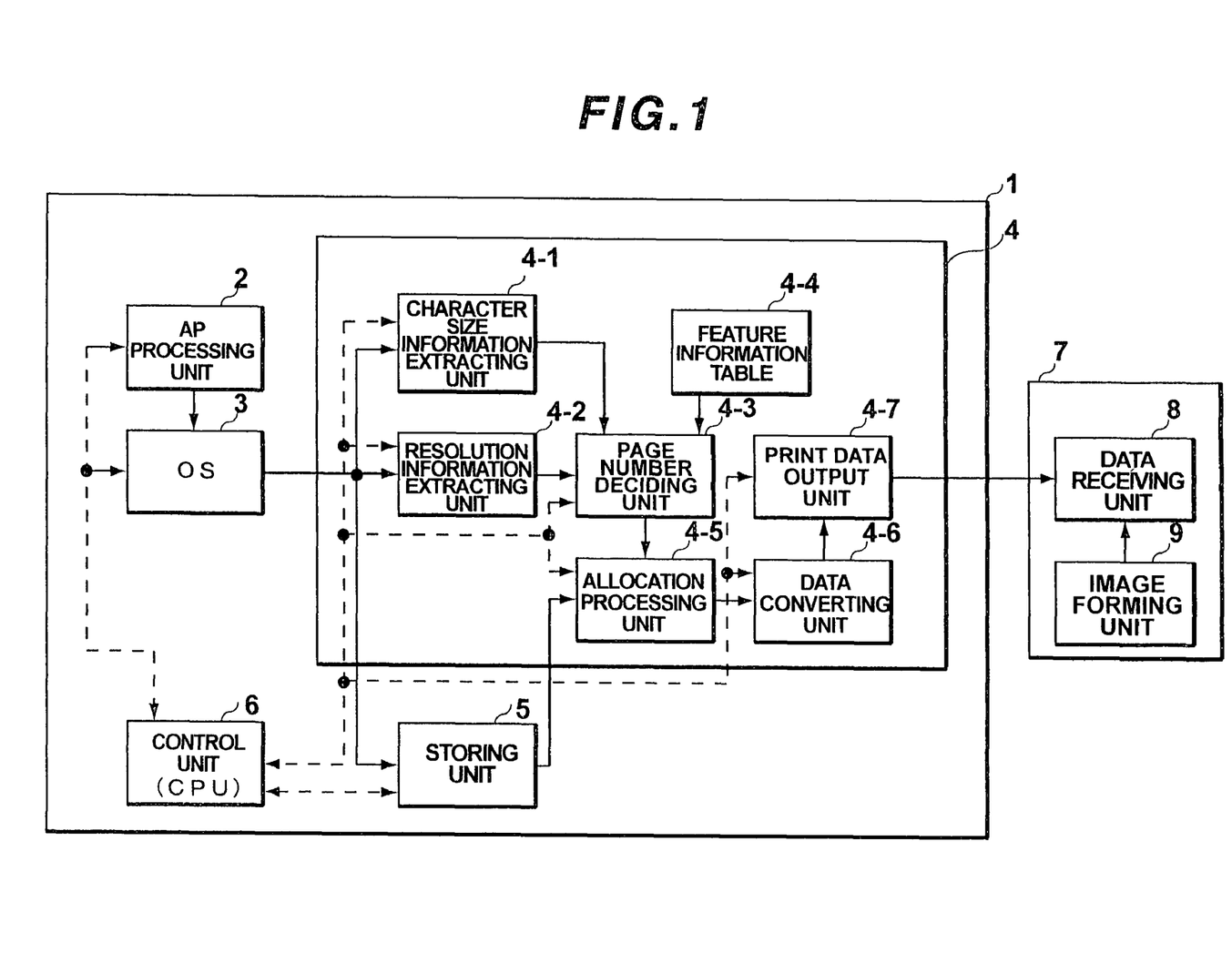
FIG. 1 is a constructional block diagram of an information processing apparatus of the embodiment 1

FIG. 1 is a constructional block diagram of an information processing apparatus of the embodiment 1

As shown in the diagram, an information processing apparatus 1 of the embodiment 1 has therein: an application (AP) processing unit 2; an operating system (OS) 3; a printer driver 4; a storing unit 5; and a control unit 6. In addition to an ordinary image processing function, according to the invention, the information processing apparatus 1 has an arranging function in which a plurality of inputted pages are reduced and arranged to pages of the number smaller than the number of inputted pages. Generally, a personal computer (hereinafter, abbreviated to "PC") is used as an information processing apparatus 1

The AP processing unit 2 is a portion which enables the operator to form image information including a sentence, diagram-drawing, and the like under management of the OS 3. This portion is control means of the control unit 6 which is constructed by a method whereby a CPU executes a predetermined program which has previously been installed in a hard disk or the like in the PC.

The OS 3 is fundamental operation control means of the information processing apparatus 1 for executing management of processes, writing of data into the storing unit 5, fetching of character data from a keyboard (not shown), and the like. The OS 3 is control means of the control unit 6 which is constructed by a method whereby the CPU executes a basic program which has previously been installed in the hard disk or the like in the PC.

The printer driver 4 is a set of program modules which are necessary for ordinary control of a printer 7 in accordance with a print request of the AP processing unit 2. In the embodiment, the printer driver 4 is also a set of program modules for constructing the following units which are executed by the CPU: a character size information extracting unit 4-1; a resolution information extracting unit 4-2; a page number deciding unit 4-3; an page arranging unit 4-5; a data converting unit 4-6; and a print data output unit 4-7. The printer driver 4 further includes a feature information table 4-4 necessary for the page number deciding unit 4-3 during the operation. The printer driver 4 has previously been installed in the hard disk or the like in the PC.

The character size information extracting unit 4-1 is a portion for extracting a character size serving as feature information of characters which are used in a document from the image information received from the AP processing unit 2 through the OS 3.

The resolution information extracting unit 4-2 is a portion for extracting resolution serving as feature information of the characters which are used in the document from the image information received from the AP processing unit 2 through the OS 3.

The page number deciding unit 4-3 is a portion for reducing the image information of a plurality of pages received from the AP processing unit 2 through the OS 3 on the basis of the character size (of the characters used in the document) extracted by the character size information extracting unit 4-1, the resolution (of the characters used in the document) extracted by the resolution information extracting unit 4-2, and the contents in the feature information table 4-4 and deciding the number of pages which are arranged into one page.

The functions of the character size information extracting unit 4-1 and the resolution information extracting unit 4-2 and the page number deciding method which is executed by the page number deciding unit 4-3 will now be described with reference to other drawings.

Figure 2A:
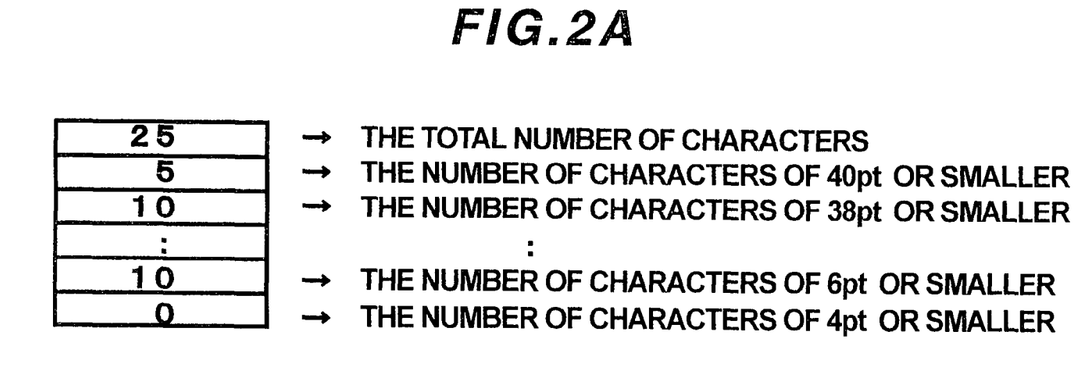
FIGS. 2A, 2B, and 2C are explanatory diagrams of a page number deciding method.
Figure 2B:
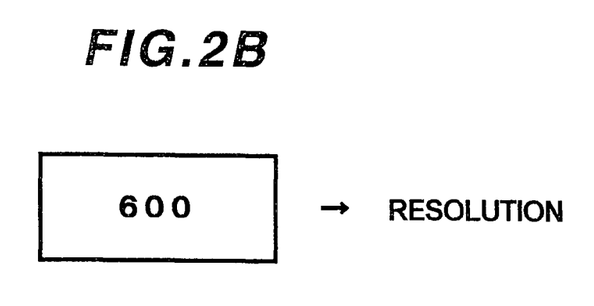
Figure 2C:
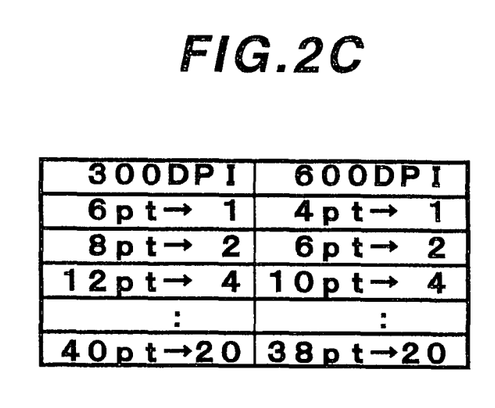

FIGS. 2A, 2B, and 2C are explanatory diagrams of the page number deciding method.

FIG. 2A shows an example of the character size information extraction which is executed by the character size information extracting unit 4-1. FIG. 2B shows an example of the resolution information extraction which is executed by the resolution information extracting unit 4-2. FIG. 2C shows an example of the feature information table 4-4.

As shown in FIG. 2A, each time a character used in the document is received, the character size information extracting unit 4-1 extracts the character size and classifies all characters used in the document on the basis of the character size. For example, it is now assumed that there are 25 characters in total and they are classified every character size as follows: the number of characters whose sizes are equal to or smaller than 4 pt (Point number) is equal to 0; the number of characters whose sizes are larger than 4 pt and are equal to or smaller than 6 pt is equal to 10; the number of characters whose sizes are larger than 6 pt and are equal to or smaller than 38 pt is equal to 10; and the number of characters whose sizes are larger than 38 pt and are equal to or smaller than 40 pt is equal to 5.

As shown in FIG. 2B, it is assumed that the resolution information extracting unit 4-2 has extracted, for example, 600 dpi as resolution of the characters used in the document.

The page number deciding unit 4-3 accumulates the number of characters from the bottom of the character size information with reference to FIG. 2A and obtains the character size of the characters whose accumulated number reaches a predetermined ratio (for example, 80%) of the total number of characters. In this instance, 80% of the total number of characters is equal to 20 characters and the sum of "10" as the number of characters whose sizes are equal to or smaller than 6 pt from the bottom of the character size information and "10" as the number of characters whose sizes are larger than 6 pt and are equal to or smaller than 38 pt is equal to 20. Therefore, the obtained character size (hereinafter, such a size is referred to as a "80% character size") is equal to 38 pt. The page number deciding unit 4-3 obtains the resolution "600 dpi" with reference to FIG. 2B.

In the feature information table 4-4 shown in FIG. 2C, the numbers of allocation pages based on the "80% character size" (an example) in the resolution "300 dpi" and "600 dpi" are determined. Since the "80% character size" of the resolution "600 dpi" is obtained as 38 pt from FIGS. 2A and 2B here, the page number deciding unit 4-3 decides that the number of pages is equal to 20 from FIG. 2C.

It is desirable to determine the relation between the character size (Point number) and the arranged page number in FIG. 2C by the following method.

Explanation will be made on the assumption that the minimum character size at which the characters can be viewed in the column of "300 dpi" is equal to 6 pt. Assuming that the number of allocation pages is equal to 2, the area per allocation page is reduced into the half. However, the character size is equal to divided by the square root of 2. That is, it is preferable to select it so that a magnification of a root of a rate of the arranged page number is equal to a magnitude of the character size. At this time, the character size is nearly equal to 8 pt. (Multiply 6 point by the square root of 2.)

Although the above explanation has been made on the assumption that the number of pages is determined by the characters having the predetermined ratio (80%) in all of the characters included in the document, it is naturally desirable to decide the number of pages from the minimum character size and the resolution of the characters included in the document in order to avoid the deterioration of the visibility of all of the characters.

Returning to FIG. 1 the page arranging unit 4-5 is a portion for reading the image information of a plurality of pages stored in the storing unit 5, reducing the image information of the plurality of pages on the basis of the number decided by the page number deciding unit 4-3, and allocating to one page.

The data converting unit 4-6 is a portion for converting the arranged image information into print data.

The print data output unit 4-7 is a portion for receiving the print data from the data converting unit 4-6 and sending it to the printer 7.

The storing unit 5 is a RAM (memory) for temporarily storing all of the image information received from the AP processing unit 2 through the OS 3.

The control unit 6 is a CPU for controlling the whole information processing apparatus 1 Particularly, in the embodiment, the control unit 6 is a portion for constructing the character size information extracting unit 4-1, resolution information extracting unit 4-2, page number deciding unit 4-3, page arranging unit 4-5, data converting unit 4-6, and print data output unit 4-7 by executing predetermined program modules included in the printer driver 4.

Figure 3:
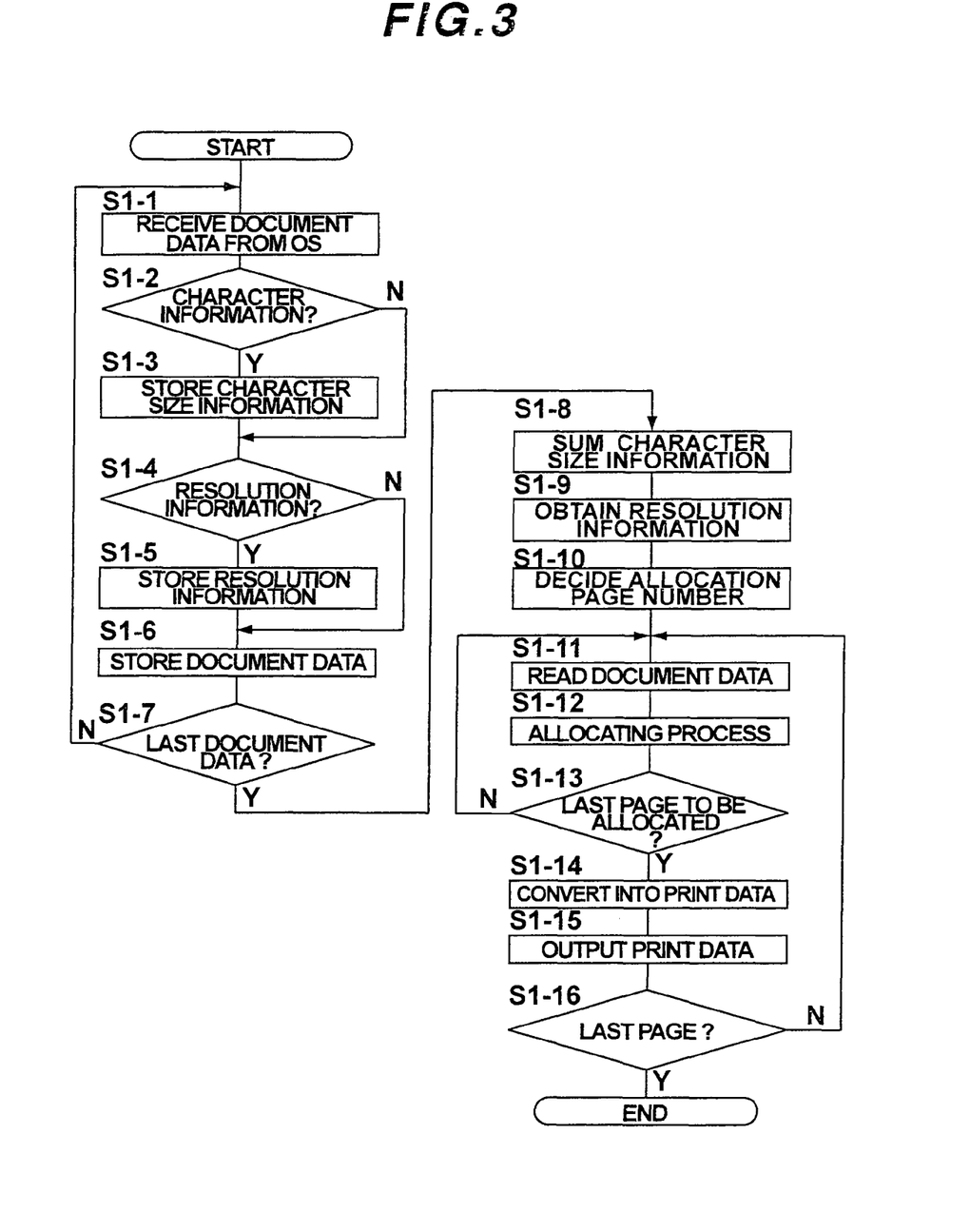
FIG. 3 is a flowchart of the embodiment 1

The operation of the information processing apparatus 1 in the embodiment 1 will now be described with reference to a flowchart.

FIG. 3 is the flowchart for the embodiment 1

Steps S1-1 to S1-16 will now be sequentially described.

Step S1-1:
The character size information extracting unit 4-1 (FIG. 1) receives the image information (document data) formed by the operator by using the AP processing unit 2 (FIG. 1) through the OS 3 (FIG. 1).

Step S1-2:
The character size information extracting unit 4-1 (FIG. 1) discriminates whether or not the received image information is character information. If it is the character information, step S1-3 follows. If it is not the character information, step S1-4 follows.

Step S1-3:
The character size information extracting unit 4-1 (FIG. 1) stores the character size information into a register in the CPU on the basis of the number of characters to be drawn and the designated character size.

Step S1-4:
The resolution information extracting unit 4-2 (FIG. 1) discriminates whether or not the received image information is resolution information. If it is the resolution information, step S1-5 follows. If it is not the resolution information, step S1-6 follows.

Step S1-5:
The resolution information extracting unit 4-2 (FIG. 1) stores the designated resolution information into the register.

Step S1-6:
The image information received through the OS 3 (FIG. 1) is stored into the storing unit 5 (FIG. 1).

Step S1-7:
Steps S1-1 to S1-7 are repeated until the obtainment of the character size information and the resolution information of the last image information is finished. When the obtainment of the character size information and the resolution information of all of the image information is finished, the processing routine advances to step S1-8.

Step S1-8:
The character size information extracting unit 4-1 (FIG. 1) sums the stored character size information. At this time, the foregoing 80% character size is calculated.

Step S1-9:
The resolution information extracting unit 4-2 (FIG. 1) obtains the designated resolution information.

Step S1-10:
The page number deciding unit 4-3 (FIG. 1) receives the 80% character size from the character size information extracting unit 4-1 (FIG. 1) and the designated resolution information from the resolution information extracting unit 4-2 (FIG. 1), respectively, and determines the arranged page number on the basis of the contents in the feature information table 4-4 (FIG. 1).

Step S1-11:
The page arranging unit 4-5 (FIG. 1) sequentially reads out the image information stored in the storing unit 5 (FIG. 1).

Step S1-12:
The page arranging unit 4-5 (FIG. 1) reduces the image data (document data) on the basis of the arranged page number decided in step S1-10 and information showing to which page the data that is at present being processed corresponds, rotates the reduced image data if necessary, and arranges it into one page.

Step S1-13:
The page arranging unit 4-5 (FIG. 1) discriminates whether or not the data which is at present being processed is the data of the last page. If it is the last page to be arranged, step S1-14 follows. If it is not the last page, the processing routine is returned to step S1-11 and the processes of steps S1-11 to S1-13 are repeated. The last page to be arranged denotes, for example, the second page in the 2-UP print mode (that is, two pages are arranged and printed into one page) and the fourth page in the 4-UP print mode (that is, four pages are arranged and printed into one page). Further, the last page of the document is also included in such a last page.

Step S1-14:
The data converting unit 4-6 (FIG. 1) converts the arranged image data (document data) into the print data.

Step S1-15:
The print data output unit 4-7 (FIG. 1) sends the print data to the printer 7 (FIG. 1).

Step S1-16:
The print data output unit 4-7 (FIG. 1) discriminates whether or not the transmitted print data is the last page. If it is not the last page, the processing routine is returned to step S1-11 and the processes of steps S1-11 to S1-16 are repeated. The last page is sent and the processing routine is finished.

In the above description, either steps S1-2 and S1-3 or steps S1-4 and S1-5 can be executed first. Either the allocating process of step S1-12 or the conversion into the print data of step S1-14 can be executed first or can be executed when the image data (document data) is stored in step S1-6. If the conversion into the print data is executed at the time of the storage of the image data (document data) of step S1-6, the print data is stored into the storing unit 5 (FIG. 1). The allocating process (step S1-1) is executed with respect to the print data.

As described above, according to the embodiment, since the arranged page number is determined on the basis of the combination of two feature information of the character size information and the resolution information, such an effect that the deterioration in the visibility of the arranged pages decreases is obtained.

Although the explanation has been made by limiting to the case where the character size information and the resolution information are used as two feature information, the invention is not limited to such an example. That is, other information such as font information or the like designated in characters can be also used. With respect to the font information, it is effective if the following information is used: language information (roman font/Japanese font); font weight information (thickness information of the font); the minimum number of dots which can be discriminated (the minimum number of dots in which the font can be discriminated); or the like. A combination of two or more of those information can be also used. The invention can be also applied to the case where an arbitrary number of any information are used if a plurality of information which can discriminate the visibility of the arranged pages are used.

Embodiment 2

In the embodiment 2, a parameter storing unit is used in place of the feature information table 4-4 (FIG. 1) in the embodiment 1. An input dialog of an allocation page table necessary for the operator to set the arranged page number has been stored in the parameter storing unit. It is an object of the embodiment 2 to prevent the deterioration in the visibility due to a difference of eyesight or the like by a method whereby the operator sets a predetermined numerical value into the input dialog in consideration of his own eyesight.

Figure 4:
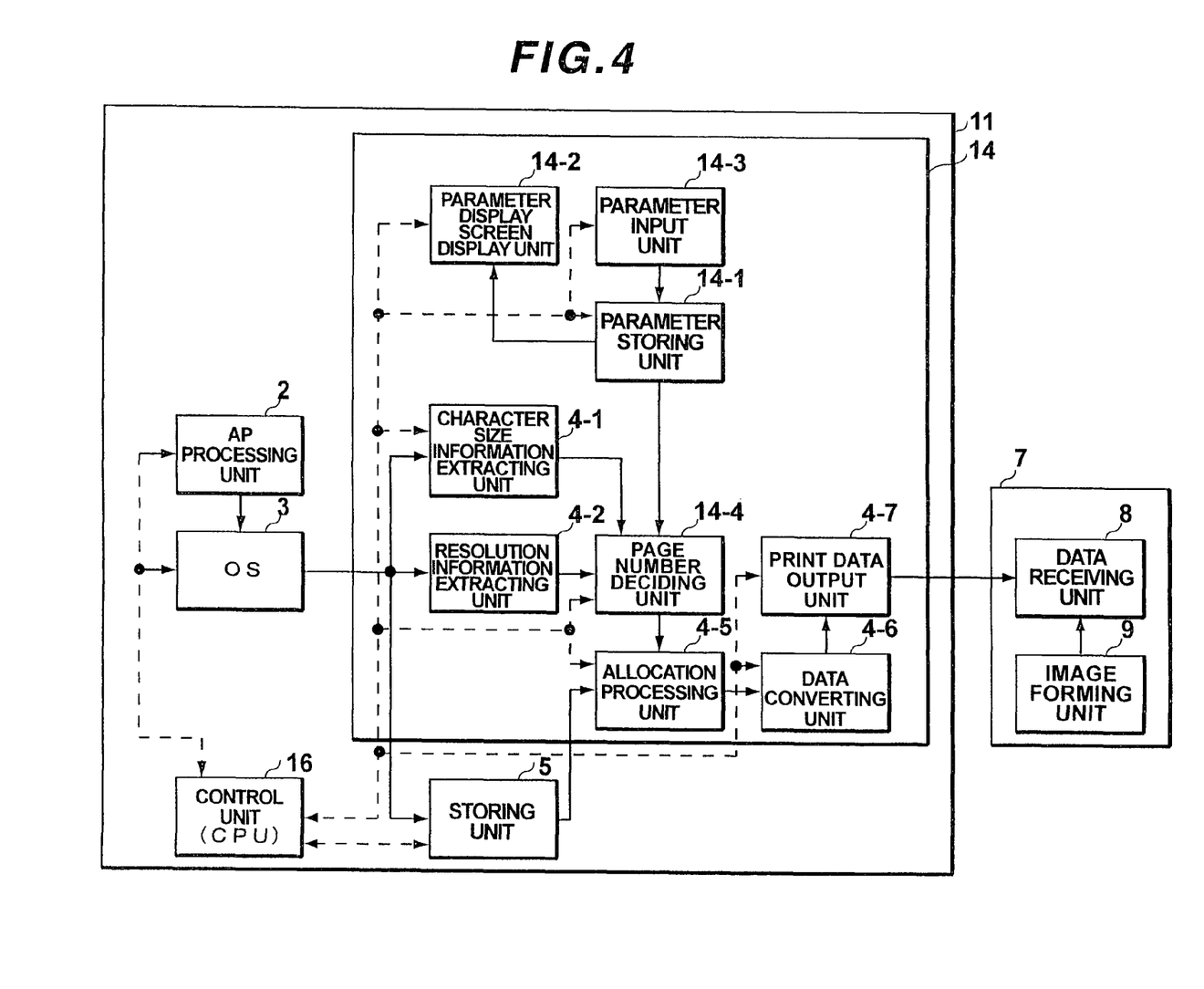
FIG. 4 is a constructional block diagram of an information processing apparatus of the embodiment 2.

FIG. 4 is a constructional block diagram of an information processing apparatus of the embodiment 2.

As shown in the diagram, an information processing apparatus 11 of the embodiment 2 has therein: the AP processing unit 2; the OS 3; a printer driver 14; the storing unit 5; and a control unit 16. In addition to the ordinary image processing function, according to the invention, the information processing apparatus 11 has the allocating function in which a plurality of inputted pages are reduced and arranged to pages of the number smaller than the number of inputted pages. Generally, the personal computer (PC) is used as an information processing apparatus 11. Only portions different from the embodiment 1 will be described. Portions similar to those in the embodiment 1 are designated by the same reference numerals and their description is omitted here.

The printer driver 14 is a set of dedicated program modules which are necessary for the ordinary control of the printer 7 in accordance with the print request of the AP processing unit 2. In the embodiment, the printer driver 14 is also a set of program modules for constructing the following units which are executed by the CPU: the character size information extracting unit 4-1; the resolution information extracting unit 4-2; the page arranging unit 4-5; the data converting unit 4-6; the print data output unit 4-7; a parameter storing unit 14-1; a parameter display screen display unit 14-2; a parameter input unit 14-3; and a page number deciding unit 14-4. The printer driver 14 has previously been installed in the hard disk or the like in the PC.

The parameter storing unit 14-1 is a memory for storing the input dialog of the allocation page table corresponding to the feature information table (FIG. 2C) in the embodiment 1. Further, the parameter storing unit 14-1 is a portion for storing the allocation page table after the predetermined numerical value was set into the input dialog. An example of the allocation page table will now be described with reference to other drawings.

Figure 5:
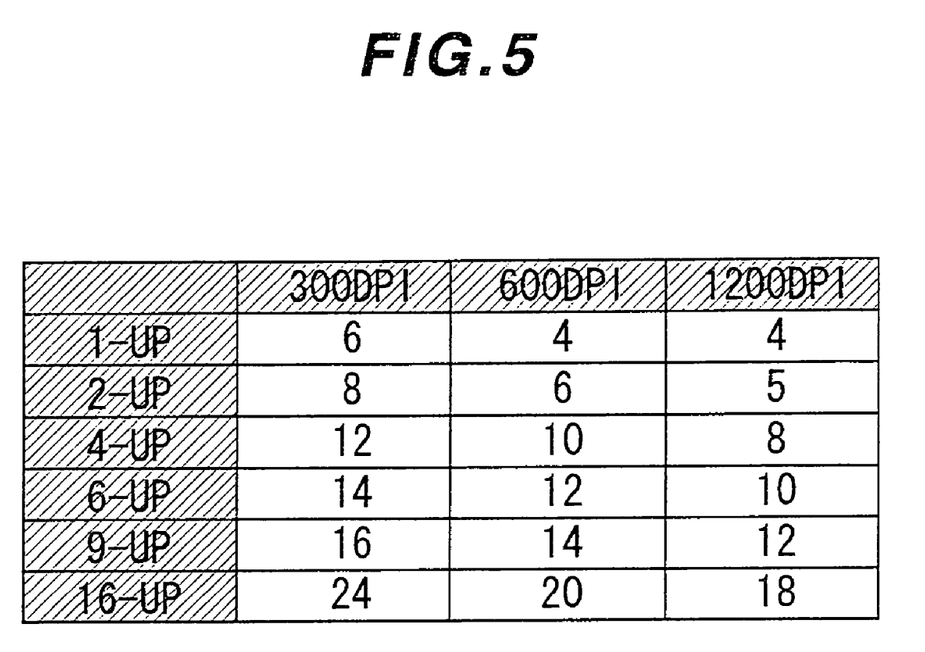
FIG. 5 is an explanatory diagram of an allocation page table.

FIG. 5 is an explanatory diagram of the allocation page table.

As shown in the diagram, the resolution (three kinds of resolution of 300 dpi, 600 dpi, and 1200 dpi) are used as parameters here. Six kinds of arranged page numbers of 1-UP, 2-UP, 4-UP, 6-UP, 9-UP, and 16-UP are determined on the basis of the 80% character size (example) at that time. Initially, the input dialog in which the numerical value of the 80% character size is not included has been stored in the parameter storing unit 14-1 and the numerical value of the 80% character size is set by the operator.

Returning to FIG. 4, the parameter display screen display unit 14-2 is a portion for allowing a display of the PC to display the input dialog of the allocation page table stored in the parameter storing unit 14-1.

The parameter input unit 14-3 is a portion for enabling the operator to set the predetermined numerical value as a numerical value of the 80% character size into the input dialog of the allocation page table in consideration of his own eyesight or the like.

The page number deciding unit 14-4 is a portion for deciding the number of pages which are arranged into one page in the case where the image information of a plurality of pages received from the AP processing unit 2 through the OS 3 is arranged into one page. In this instance, the number of allocation pages is decided on the basis of the character size (of the characters used in the document) extracted by the character size information extracting unit 4-1, the resolution (of the characters used in the document) extracted by the resolution information extracting unit 4-2, and the contents in the allocation page table stored in the parameter storing unit 14-1.

The control unit 16 is a CPU for controlling the whole information processing apparatus 11. Particularly, in the embodiment, the control unit 16 is a portion for constructing the character size information extracting unit 4-1, resolution information extracting unit 4-2, page arranging unit 4-5, data converting unit 4-6, print data output unit 4-7, parameter display screen display unit 14-2, parameter input unit 14-3, and page number deciding unit 14-4 by executing predetermined program modules included in the printer driver 14.

Figure 6:
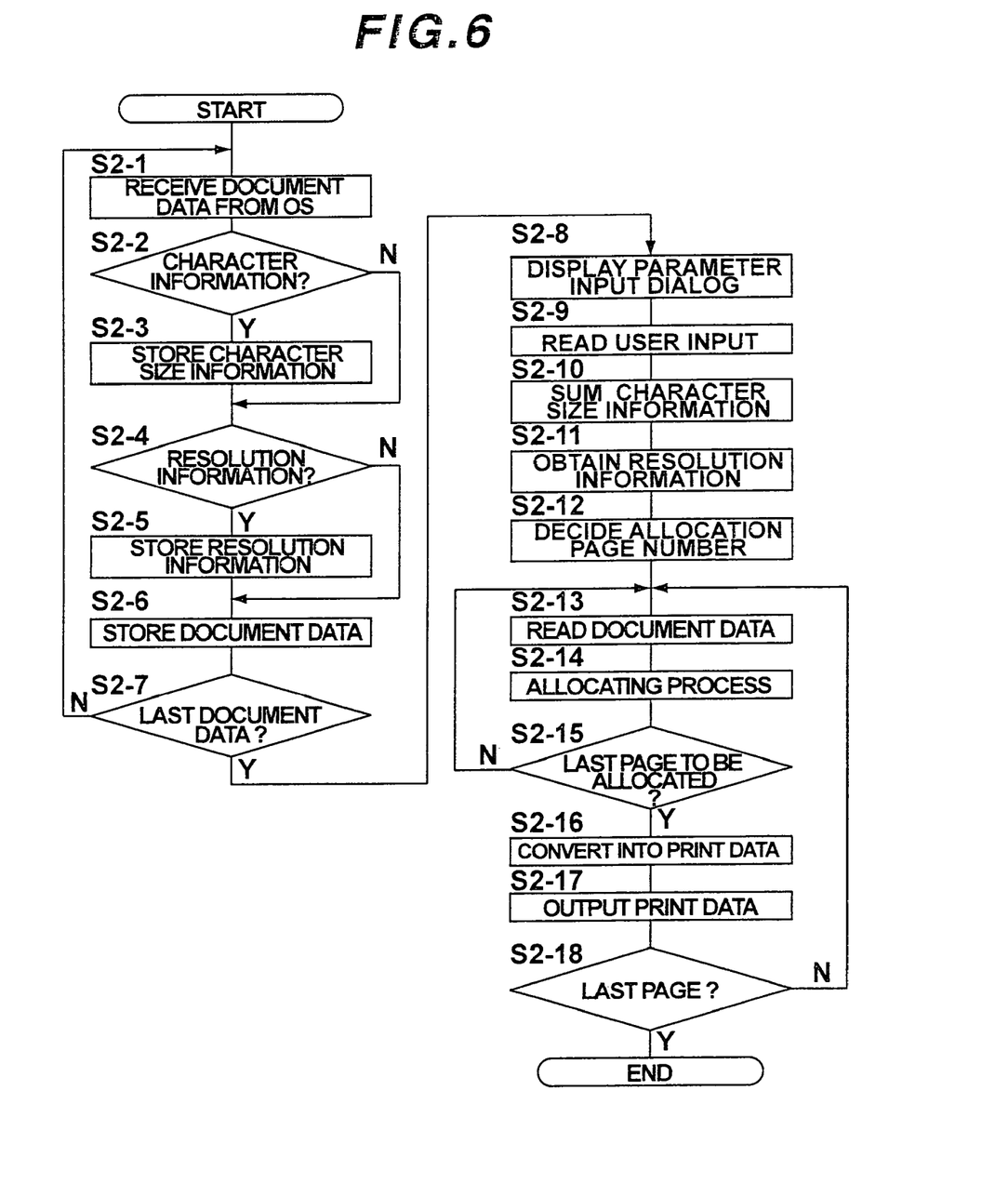
FIG. 6 is a flowchart of the embodiment 2.

The operation of the information processing apparatus 11 in the embodiment 2 will now be described with reference to a flowchart.

FIG. 6 is the flowchart for the embodiment 2.

Steps S2-1 to S2-18 will now be sequentially described.

Step S2-1:

The character size information extracting unit 4-1 (FIG. 4) receives the image information (document data) formed by the operator by using the AP processing unit 2 (FIG. 4) through the OS 3 (FIG. 4).

Step S2-2:

The character size information extracting unit 4-1 (FIG. 4) discriminates whether or not the received image information is the character information. If it is the character information, step S2-3 follows. If it is not the character information, step S2-4 follows.

Step S2-3:
The character size information extracting unit 4-1 (FIG. 4) stores the character size information into the register in the CPU on the basis of the number of characters to be drawn and the designated character size.

Step S2-4:
The resolution information extracting unit 4-2 (FIG. 4) discriminates whether or not the received image information is the resolution information. If it is the resolution information, step S2-5 follows. If it is not the resolution information, step S2-6 follows.

Step S2-5:
The resolution information extracting unit 4-2 (FIG. 4) stores the designated resolution information into the register.

Step S2-6:
The image information received through the OS 3 (FIG. 4) is stored into the storing unit 5 (FIG. 4).

Step S2-7:
Steps S2-1 to S2-7 are repeated until the obtainment of the character size information and the resolution information of the last image information is finished. When the obtainment of the character size information and the resolution information of all of the image information is finished, the processing routine advances to step S2-8.

Step S2-8:
The parameter display screen display unit 14-2 (FIG. 4) allows the display of the PC to display the input dialog of the allocation page table stored in the parameter storing unit 14-1 (FIG. 4).

Step S2-9:
The parameter input unit 14-3 (FIG. 4) sets the numerical value inputted by the operator as an allocation page table.

Step S2-10:
The character size information extracting unit 4-1 (FIG. 4) sums the stored character size information. At this time, the foregoing 80% character size is obtained.

Step S2-11:
The resolution information extracting unit 4-2 (FIG. 4) obtains the designated resolution information.

Step S2-12:
The page number deciding unit 14-4 (FIG. 4) receives the 80% character size from the character size information extracting unit 4-1 (FIG. 4) and the designated resolution information from the resolution information extracting unit 4-2 (FIG. 4), respectively, and determines the arranged page number on the basis of the contents in the allocation page table set in step S2-9.

Step S2-13:
The page arranging unit 4-5 (FIG. 4) sequentially reads out the image information stored in the storing unit 5 (FIG. 4).

Step S2-14:
The page arranging unit 4-5 (FIG. 4) reduces the image data (document data) on the basis of the arranged page number decided in step S2-12 and information showing to which page the data that is at present being processed corresponds, rotates the reduced image data if necessary, and arranges it into one page.

Step S2-15:
The page arranging unit 4-5 (FIG. 4) discriminates whether or not the data which is at present being processed is the data of the last page. If it is the last page to be arranged, step S2-16 follows. If it is not the last page to be arranged, the processing routine is returned to step S2-13 and the processes of steps S2-13 to S2-15 are repeated. The last page to be arranged denotes, for example, the second page in the 2-UP print mode and the fourth page in the 4-UP print mode. Further, the last page of the document is also included in such a last page.

Step S2-16:
The data converting unit 4-6 (FIG. 4) converts the arranged image data (document data) into the print data.

Step S2-17:
The print data output unit 4-7 (FIG. 4) sends the print data to the printer 7 (FIG. 4).

Step S2-18:
The print data output unit 4-7 (FIG. 4) discriminates whether or not the transmitted print data is the last page. If it is not the last page, the processing routine is returned to step S2-13 and the processes of steps S2-13 to S2-18 are repeated. The last page is sent and the processing routine is finished.

In the above description, steps S2-8 and S2-9 can be inserted to an arbitrary position so long as it is before the arranged page number is decided.

As described above, according to the embodiment, since the operator can set the allocation page table on the basis of his own eyesight or the like, in addition to the effects in the embodiment 1 such an effect that it is possible to cope with an individual difference about whether or not the visibility deteriorates due to the eyesight or the like is obtained.

Although the explanation has been made by limiting to the case where the operator sets the allocation page table on the basis of his own eyesight or the like, the embodiment is not limited to such an example. That is, it is also possible to construct the apparatus in such a manner that a plurality of kinds of allocation page tables are preliminarily stored in the parameter storing unit 14-1 and the operator freely selects a desired one of a plurality of kinds of selection tables in consideration of his own eyesight or the like.

Embodiment 3

It is an object of the embodiment to provide a function of discriminating whether or not the allocation page table set by the method whereby the operator inserts the predetermined numerical value into the input dialog in consideration of his own eyesight or the like is adapted to an intention of the operator in the embodiment 2.

Figure 7:
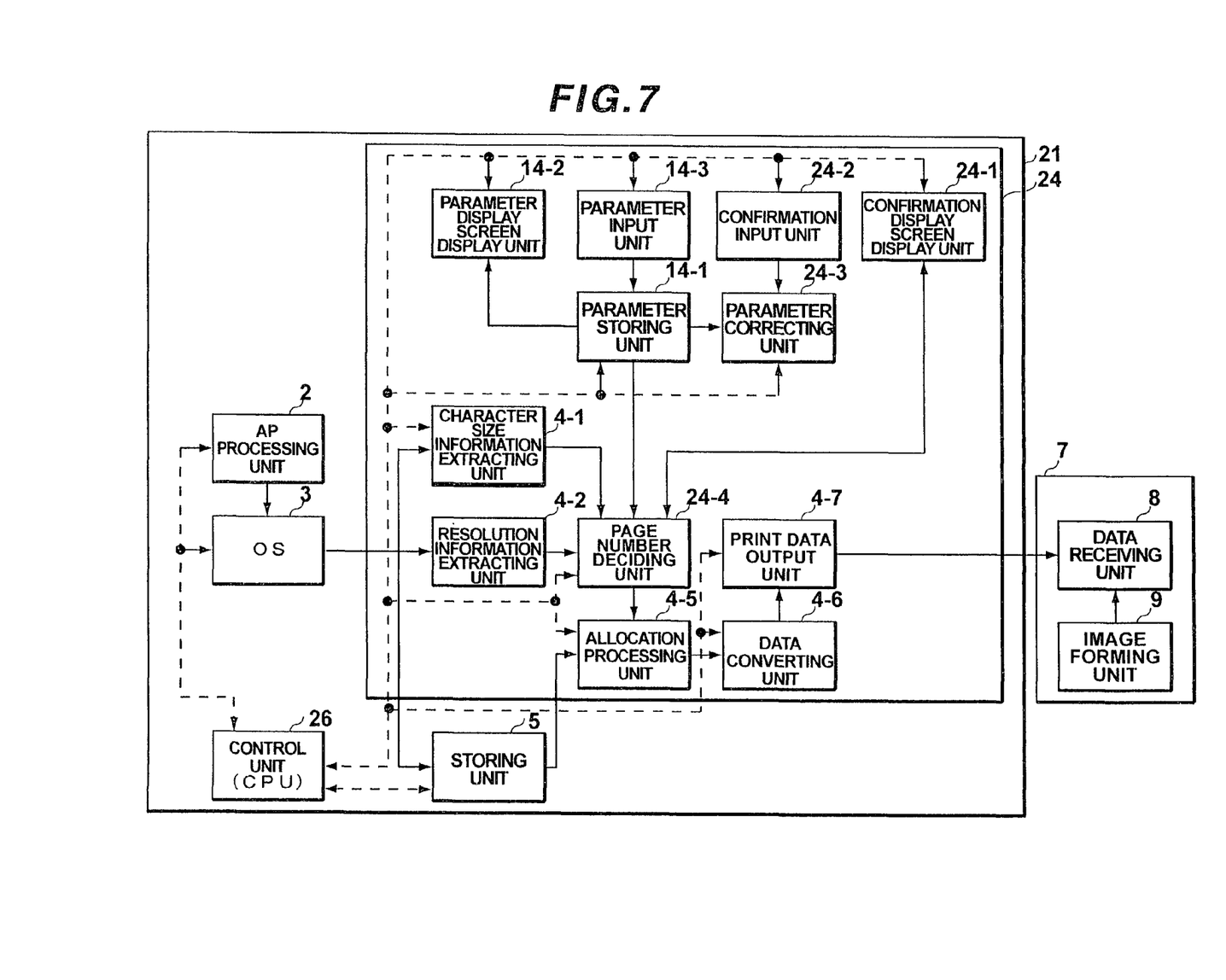
FIG. 7 is a constructional block diagram of an information processing apparatus of the embodiment 3.

FIG. 7 is a constructional block diagram of an information processing apparatus of the embodiment 3.

As shown in the diagram, an information processing apparatus 21 of the embodiment 3 has therein: the AP processing unit 2; the OS 3; a printer driver 24; the storing unit 5; and a control unit 26. In addition to the ordinary image processing function, according to the invention, the information processing apparatus 21 has the allocating function in which a plurality of inputted pages are reduced and arranged to pages of the number smaller than the number of inputted pages. Generally, the personal computer (PC) is used as an information processing apparatus 21. Only portions different from the embodiment 2 will be described. Portions similar to those in the embodiment 2 are designated by the same reference numerals and their description is omitted here.

The printer driver 24 is a set of dedicated program modules which are necessary for the ordinary control of the printer 7 in accordance with the print request from the AP processing unit 2. In the embodiment, the printer driver 24 is also a set of program modules for constructing the following units which are executed by the CPU: the character size information extracting unit 4-1; the resolution information extracting unit 4-2; the page arranging unit 4-5; the data converting unit 4-6; the print data output unit 4-7; the parameter storing unit 14-1; the parameter display screen display unit 14-2; the parameter input unit 14-3; a confirmation display screen display unit 24-1; a confirmation input unit 24-2; a parameter correcting unit 24-3; and a page number deciding unit 24-4. The printer driver 24 has previously been installed in the hard disk or the like in the PC.

The confirmation display screen display unit 24-1 is a portion for allowing the display of the PC to display a parameter (arranged page number) of the print data transmitted to the printer 7 and the input dialog box for allowing the operator who observed the print output to input a discrimination result about whether or not the parameter is correct in order to enable the operator to confirm a setting result of the allocation page table. The input dialog box is a selection item display of, for example, "optimum", "the page number is too large", "the page number is too small", and the like.

The confirmation input unit 24-2 is a portion for receiving the operator's selection of the input dialog box.

The parameter correcting unit 24-3 is a portion for correcting the parameter (arranged page number) stored in the parameter storing unit 14-1 on the basis of a confirmation result by the operator. That is, when the operator selects "optimum", the arranged page number is maintained as it is. When he selects "the page number is too large", the setting is changed by reducing the arranged page number by one rank. When he selects "the page number is too small", the setting is changed by increasing the arranged page number by one rank. This setting change is reflected to the next and subsequent printing.

The control unit 26 is a CPU for controlling the whole information processing apparatus 21. Particularly, in the embodiment, the control unit 26 is a portion for constructing the character size information extracting unit 4-1, resolution information extracting unit 4-2, page arranging unit 4-5, data converting unit 4-6, print data output unit 4-7, parameter display screen display unit 14-2, parameter input unit 14-3, confirmation display screen display unit 24-1, confirmation input unit 24-2, parameter correcting unit 24-3, and page number deciding unit 24-4 by executing predetermined program modules included in the printer driver 24.

Figure 8:
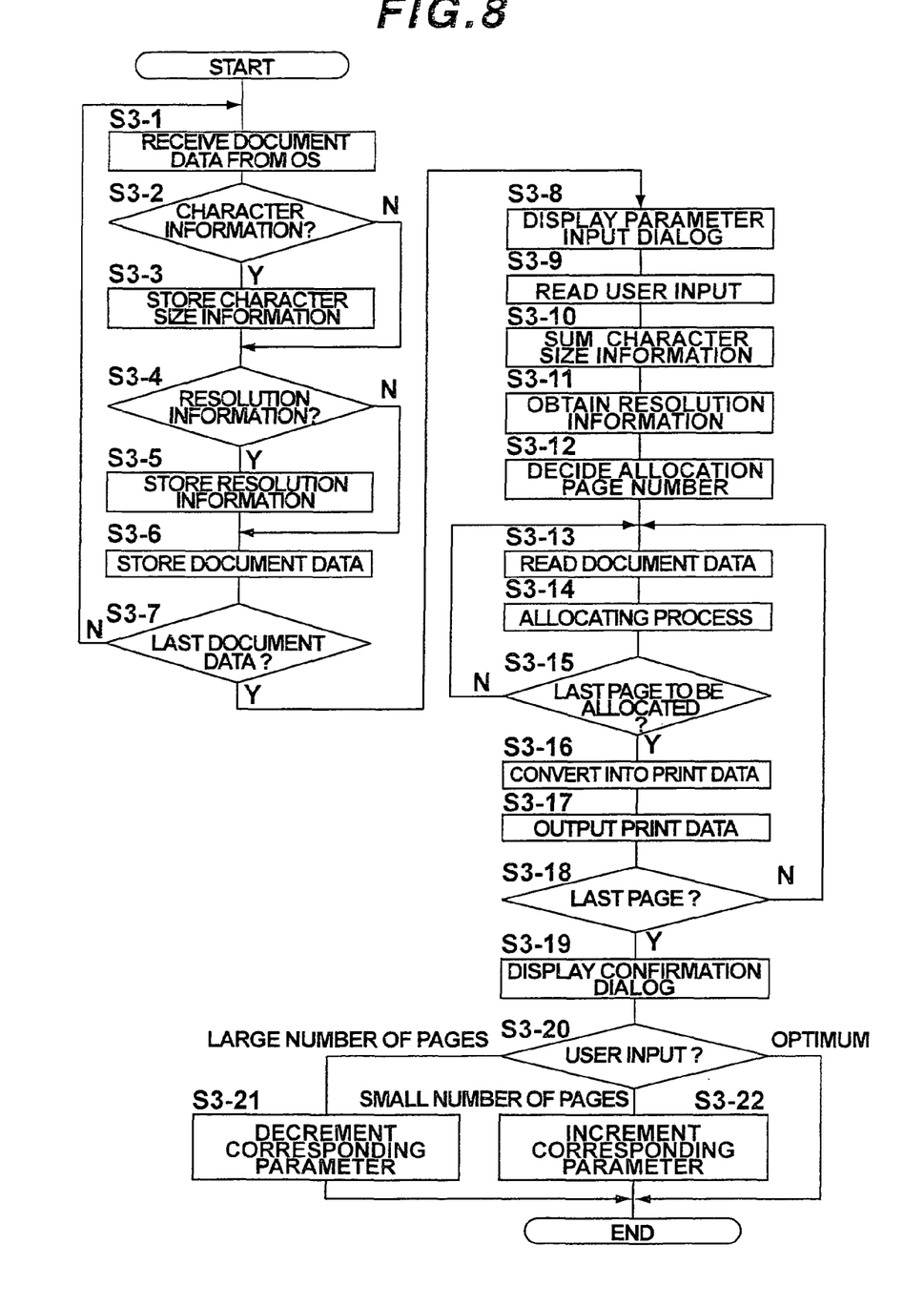
FIG. 8 is a flowchart of the embodiment 3.

The operation of the information processing apparatus 21 in the embodiment 3 will now be described with reference to a flowchart.

FIG. 8 is the flowchart for the embodiment 3.

Steps S3-1 to S3-22 will now be sequentially described.

Step S3-1:
The character size information extracting unit 4-1 (FIG. 7) receives the image information (document data) formed by the operator by using the AP processing unit 2 (FIG. 7) through the OS 3 (FIG. 7).

Step S3-2:
The character size information extracting unit 4-1 (FIG. 7) discriminates whether or not the received image information is the character information. If it is the character information, step S3-3 follows. If it is not the character information, step S3-4 follows.

Step S3-3:
The character size information extracting unit 4-1 (FIG. 7) stores the character size information into the register in the CPU on the basis of the number of characters to be drawn and the designated character size.

Step S3-4:
The resolution information extracting unit 4-2 (FIG. 7) discriminates whether or not the received image information is the resolution information. If it is the resolution information, step S3-5 follows. If it is not the resolution information, step S3-6 follows.

Step S3-5:
The resolution information extracting unit 4-2 (FIG. 7) stores the designated resolution information into the register.

Step S3-6:
The image information received through the OS 3 (FIG. 7) is stored into the storing unit 5 (FIG. 7).

Step S3-7:
Steps S3-1 to S3-7 are repeated until the obtainment of the character size information and the resolution information of the last image information is finished. When the obtainment of the character size information and the resolution information of all of the image information is finished, the processing routine advances to step S3-8.

Step S3-8:
The parameter display screen display unit 14-2 (FIG. 7) allows the display of the PC to display the input dialog of the allocation page table stored in the parameter storing unit 14-1 (FIG. 7).

Step S3-9:
The parameter input unit 14-3 (FIG. 7) sets the numerical value inputted by the operator as an allocation page table.

Step S3-10:
The character size information extracting unit 4-1 (FIG. 7) sums the stored character size information. At this time, the foregoing 80% character size is obtained.

Step S3-11:
The resolution information extracting unit 4-2 (FIG. 7) obtains the designated resolution information.

Step S3-12:
The page number deciding unit 24-4 (FIG. 7) receives the 80% character size from the character size information extracting unit 4-1 (FIG. 7) and the designated resolution information from the resolution information extracting unit 4-2 (FIG. 7), respectively, and determines the arranged page number on the basis of the contents in the allocation page table set in step S3-9.

Step S3-13:
The page arranging unit 4-5 (FIG. 7) sequentially reads out the image information stored in the storing unit 5 (FIG. 7).

Step S3-14:
The page arranging unit 4-5 (FIG. 7) reduces the image data (document data) on the basis of the arranged page number decided in step S3-12 and information showing to which page the data that is at present being processed corresponds, rotates the reduced image data if necessary, and arranges it into one page.

Step S3-15:
The page arranging unit 4-5 (FIG. 7) discriminates whether or not the data which is at present being processed is the data of the last page. If it is the last page to be arranged, step S3-16 follows. If it is not the last page, the processing routine is returned to step S3-13 and the processes of steps S3-13 to S3-15 are repeated. The last page to be arranged denotes, for example, the second page in the 2-UP print mode and the fourth page in the 4-UP print mode. Further, the last page of the document is also included in such a last page.

Step S3-16:

The data converting unit 4-6 (FIG. 7) converts the arranged image data (document data) into the print data.

Step S3-17:

The print data output unit 4-7 (FIG. 7) sends the print data to the printer 7 (FIG. 7).

Step S3-18:

The print data output unit 4-7 (FIG. 7) discriminates whether or not the transmitted print data is the last page. If it is not the last page, the processing routine is returned to step S3-13 and the processes of steps S3-13 to S3-18 are repeated. The last page is sent and the processing routine advances to step S3-19.

Step S3-19:

The confirmation display screen display unit 24-1 (FIG. 7) obtains the arranged page number of the print data and allows the display of the PC to display a dialog box for confirmation input.

Step S3-20:

The confirmation input unit 24-2 (FIG. 7) reads out the selection performed to the confirmation inputting dialog box by the operator and discriminates the selected item. If "optimum" is selected, the processing flow is finished. If "the page number is too large" is selected, the processing routine advances to step S3-21. If "the page number is too small" is selected, the processing routine advances to step S3-22.

Step S3-21:

The parameter correcting unit 24-3 (FIG. 7) receives a confirmation result by the operator, changes the setting so that the arranged page number of the parameter (arranged page number) stored in the parameter storing unit 14-1 (FIG. 7) is reduced by one rank, and finishes the processing flow.

Step S3-22:

The parameter correcting unit 24-3 (FIG. 7) receives the confirmation result by the operator, changes the setting so that the arranged page number of the parameter (arranged page number) stored in the parameter storing unit 14-1 (FIG. 7) is increased by one rank, and finishes the processing flow.

As described above, according to the embodiment, since the parameter (arranged page number) set by the operator can be changed on the basis of the evaluation of the print result, in addition to the effect in the embodiment 2, such an effect that the load of the parameter setting by the operator can be lightened is obtained.

The explanation has been made on the assumption that all of the character size information extracting unit 4-1, resolution information extracting unit 4-2, page arranging unit 4-5, data converting unit 4-6, print data output unit 4-7, parameter display screen display unit 14-2, parameter input unit 14-3, confirmation display screen display unit 24-1, confirmation input unit 24-2, parameter correcting unit 24-3, and page number deciding unit 24-4 constructed in the embodiments 1 to 3 are the control means of the control unit constructed by the method whereby the CPU executes the predetermined programs. However, the invention is not limited to such an example. That is, all or a part of those plurality of units can be also constructed by a dedicated electronic circuit.

Although the explanation has been made above on the assumption that the image forming apparatus is the PC, the invention is not limited to such an example. That is, the printing apparatus such as printer, FAX, MFP, or the like can be also used as an image processing apparatus.

The present invention is not limited to the foregoing embodiments but many modifications and variations are possible within the spirit and scope of the appended claims of the invention.

What is claimed is:

1. An image processing apparatus, comprising:
   a storage unit which stores a document information;
   a first information extractor which extracts first feature information from said document information, the first feature information being a representation character size that represents a maximum size of characters whose accumulated number reaches a predetermined ratio of a total number of characters included in the document information, the accumulated number including numbers of characters included in the document information in order of character sizes of the characters beginning from a minimum character size;
   a second information extractor which extracts second feature information different from said first feature information from said document information, the second feature information being resolution information of image data included in the document information;
   a page number deciding unit which decides an arranged page number serving as the number of logical pages included in one physical page on the basis of said first feature information and said second feature information; and
   a page arranging unit which converts the document information stored in said storage unit into said logical pages, decides a reduction rate of the logical pages according to the arranged page number, and arranges said logical pages into said physical page on the basis of said arranged page number and the decided reduction rate.

2. The image processing apparatus according to claim 1, further comprising a parameter storing unit which stores parameter information for specifying decision of said arranged page number by said page number deciding unit.

3. The image processing apparatus according to claim 2, further comprising:
   a setting display unit which displays a setting dialog in order to set said parameter information; and
   a parameter setting input unit which obtains a setting input based on said dialog.

4. The image processing apparatus according to claim 2, further comprising:
   a display unit which displays a confirmation evaluation dialog to obtain a confirmation evaluation of a setting result of said parameter information; and
   a parameter correcting unit which corrects said parameter information on the basis of the confirmation evaluation of said setting result.

5. The image processing apparatus according to claim 1, further comprising a parameter storing unit which stores parameter information for specifying decision of said arranged page number by said page number deciding unit.

6. The image processing apparatus according to claim 1, further comprising a parameter storing unit which stores parameter information for specifying decision of said arranged page number by said page number deciding unit.

7. The image processing apparatus according to claim 1, wherein said second feature information is font information.

8. The image processing apparatus according to claim 7, further comprising a parameter storing unit which stores parameter information for specifying decision of said arranged page number by said page number deciding unit.

* * * * *